(12) United States Patent
Takeda

(10) Patent No.: US 10,754,944 B2
(45) Date of Patent: Aug. 25, 2020

(54) PROCESSING SYSTEM, AND PROCESSING METHOD AND PROGRAM

(71) Applicant: Yuta Takeda, Kyoto (JP)

(72) Inventor: Yuta Takeda, Kyoto (JP)

( * ) Notice: Subject to any disclaimer, the term of this patent is extended or adjusted under 35 U.S.C. 154(b) by 72 days.

(21) Appl. No.: 15/765,568

(22) PCT Filed: Dec. 13, 2016

(86) PCT No.: PCT/JP2016/086962
§ 371 (c)(1),
(2) Date: Apr. 3, 2018

(87) PCT Pub. No.: WO2017/130583
PCT Pub. Date: Aug. 3, 2017

(65) Prior Publication Data
US 2019/0080083 A1 Mar. 14, 2019

(30) Foreign Application Priority Data
Jan. 27, 2016 (JP) .................................. 2016-013880

(51) Int. Cl.
*G06F 21/54* (2013.01)
*G06F 11/36* (2006.01)
(Continued)

(52) U.S. Cl.
CPC .......... *G06F 21/54* (2013.01); *G06F 11/3604* (2013.01); *G06F 21/125* (2013.01); *G06F 21/563* (2013.01)

(58) Field of Classification Search
CPC .... G06F 21/54; G06F 11/3604; G06F 21/125; G06F 21/563
(Continued)

(56) References Cited

U.S. PATENT DOCUMENTS 6,654,751 B1 * 11/2003 Schmugar ............. G06F 21/561
7,287,166 B1 * 10/2007 Chang ..................... G06F 21/54
713/176
(Continued)

FOREIGN PATENT DOCUMENTS

| JP | 2015-501961 A | 1/2015 |
|---|---|---|
| JP | 2015-534690 A | 12/2015 |
| JP | 2016-9405 A | 1/2016 |

OTHER PUBLICATIONS

Erlingsson, "XFI: Software Guards for System Address Spaces", 2006, USENIX, pp. 77-88 (Year: 2006).*
(Continued)

*Primary Examiner* — Alexander Lagor
*Assistant Examiner* — Gregory A Lane
(74) *Attorney, Agent, or Firm* — Renner, Otto, Boisselle & Sklar, LLP

(57) ABSTRACT

To reliably protect users or systems from a program prepared by a malicious developer. Provided is a processing system configured to process a program transmitted from outside through a wired or wireless network. The processing system includes: a reception module configured to receive the program; an addition module configured to add to the program a gate component that restricts a process of attacking a user or the system; and an alteration module configured to alter, in the program, a code having a certain keyword or syntax to change a destination to be referred to by the code having the keyword or syntax to the gate component.

3 Claims, 5 Drawing Sheets

(51) Int. Cl.
    *G06F 21/12*         (2013.01)
    *G06F 21/56*         (2013.01)

(58) Field of Classification Search
    USPC .......................................................... 726/22
    See application file for complete search history.

(56) References Cited

U.S. PATENT DOCUMENTS

| | | |
|---|---|---|
| 2013/0117845 A1 | 5/2013 | Kerschbaumer et al. |
| 2014/0173552 A1* | 6/2014 | Beale ........................ G06F 8/41 717/106 |
| 2014/0237622 A1* | 8/2014 | Chang .................... G06F 21/54 726/27 |
| 2015/0220734 A1 | 8/2015 | Nalluri et al. |
| 2017/0277617 A1* | 9/2017 | Ham ........................ G06F 8/33 |

OTHER PUBLICATIONS

International Search Report for corresponding International Application No. PCT/JP2016/086962 dated Dec. 28, 2016.

\* cited by examiner

Fig,2

```
window.open("http://maliciousaaaasite.com/","welcome to maliciousaaaa site");
 .
 .
 .
var w = window;
w.open("http://maliciousaaaasite.com/","welcome to maliciousaaaa site");
 .
 .
var o = "open";
window[o]("http://maliciousaaaasite.com/","welcome to maliciousaaaasite");
 .
 .
this.open("http://maliciousaaaasite.com/","welcome to maliciousaaaa site");
 .
open("http://maliciousaaaasite.com/","welcome to maliciousaaaa site");
 .
 .
 .
var w = window;
var o = "open";
var url ="http://maliciousaaaasite.com/";
var msg ="welcome to maliciousaaaa site";
w[o](url, msg);
```

Fig,3

```
function FakeWindow(){
    this.open=function(url,msg){
        if( url=="http://safesite.com"){
            window.open(url,msg);
        }else{
            throw"open function cannot be used";
        }
    }
    this.window=this;
}
var fakeWindow=new FakeWindow()};
(function(){
```
— P2

```
fakeWindow.window.open("http://maliciousaaaasite.com/","welcome to maliciousaaaa site");
.
.
.
var w = fakeWindow.window;
w.open("http://maliciousaaaasite.com/","welcome to maliciousaaaa site");
.
.
var o = "open";
fakeWindow.window[o]("http://maliciousaaaasite.com/","welcome to maliciousaaaasite");
.
.
this.open("http://maliciousaaaasite.com/","welcome to maliciousaaaa site");
.
fakeWindow.open("http://maliciousaaaasite.com/","welcome to maliciousaaaa site");
.
.
.
.
var w = fakeWindow.window;
var o = "open";
var url ="http://maliciousaaaasite.com/";
var msg ="welcome to maliciousaaaa site";
w[o](url, msg);
.
.
.
```
— P1

```
}).call(fakeWindow);
```
— P3

PROCESSING SYSTEM, AND PROCESSING METHOD AND PROGRAM

BACKGROUND OF THE INVENTION

1. Field of the Invention

The present invention relates to, for example, a processing system that processes a program transmitted from outside through a wired or wireless network.

2. Description of the Related Art

A known system provides a user, through a website, with new content in which pieces of information in an external server are combined with a program developed by a program developer. Examples of such a system include a system in which map information provided by Google is combined with pieces of information on shops on the map including their photos and moving images to provide new content introducing an area.

In the above-mentioned example, combining a program that updates, for example, word-of-mouth information on the shops with the pieces of information including the photos and moving images may be considered. If the program developer has a malicious intention, however, he or she may cause harm to a user by incorporating in advance in the program, for example, a code for guiding a user who accesses a certain website to entice the user to a phishing website or to an unauthorized website from which the user is infected with a virus. When a program to steal confidential information stored in the system (for example, customer information) is embedded into the system, the system itself may be attacked. Thus, to embed a program into systems, even more robust security measures are required for the protection of users and systems.

An exemplary security measure is disclosed in, for example, Japanese Patent No. 4395178. This patent Literature discloses a method for preventing access to a phishing website or an unauthorized website. Specifically, a specific script portion (code portion) is extracted from a program developed by a program developer and is then normalized to assign identification information. The identification information is linked with origin information. The origin information is then compared with origin information stored in a previously prepared database. If the origin information has not been stored in the database, execution of the script (code) is restricted. Such a program is incorporated in information obtained from an external server.

The method disclosed in above patent Literature recognizes the code as a character string, however. Thus, if the code is disguised, no specific code is extracted and the identification information is not assigned, and as a result, processes that cause harm to the user cannot be restricted. Moreover, a countless number of code disguising methods are available and it is impractical to consider all possible code disguising methods. Thus, the method disclosed in Patent Literature 1 is unable to reliably prevent attack from the program developer.

The present invention has been made in view of the foregoing problem and relates to a processing system, a processing method, and a recording medium capable of reliably protecting the user or the system from a program prepared by a malicious developer.

SUMMARY OF THE INVENTION

A processing system according to the present invention is configured to process a program transmitted from outside through a wired or wireless network. The processing system includes: a reception module configured to receive the program; an addition module configured to add to the program a gate component that restricts a process of attacking a user or the system; and an alteration module configured to alter, in the program, a code having a certain keyword or syntax to change a destination to be referred to by the code having the keyword or syntax to the gate component.

The code including a process that can attack the user or the system is prepared using a certain keyword or syntax in the program developed by the developer. The processing system in an aspect of the present invention thus equally changes the destination to be referred to by the code having the keyword or syntax to the gate component. Thus, when the program is executed, any process that is performed by the code having a specific keyword or syntax is to be subjected to the gate component and the gate component restricts performance of the process of attacking the user or system during the execution of the program. Thus, even when the code performing the process that causes harm to the user is disguised, the keyword or syntax is not disguised and the destination to be referred to by the disguised code is changed to the gate component. When the program is executed, therefore, the performance of the process that causes harm to the user is restricted by the gate component. Thus, regardless of whether the code is disguised, any attack from the program developer can be reliably prevented and the user or the system can be reliably protected.

In one aspect of the present invention, the processing system further includes an analysis module configured to analyze a code having the keyword or syntax included in the program. Upon receiving an analysis result from the analysis module, the addition module combines codes to perform specific processes that have been input in advance and prepares the gate component.

With this configuration, the addition module receives an analysis result that has identified a process included in the program through the analysis, made by the analysis module, of the code having the keyword or syntax included in the program, and prepares a gate component corresponding to the process included in the program. Thus, a specific gate component can be prepared to correspond to each program. The program can thus be optimized for reducing processing time.

A processing method with the above-described processing system processes a program transmitted from outside through a wired or wireless network. The processing method includes: a first step of receiving, by a reception module, the program; a second step of adding to the program, by an addition module, a gate component that restricts a predetermined process; and altering in the program, by an alteration module, a code having a certain keyword or syntax to change a destination to be referred to by the code having the keyword or syntax to the gate component.

A recording medium stores therein a computer program for implementing the above-described processing system, the computer program processing a program transmitted from outside through a wired or wireless network. The computer program causes a computer to execute: a first step of receiving, by a reception module, a program transmitted from outside through a wired or wireless network and transmitting the program to an analysis module, and analyzing, by the analysis module, the program and detecting a code having a certain keyword or syntax included in the program; a second step of adding to the program, by an addition module, a gate component that restricts a predetermined process; and altering in the program, by an alteration module, a code having a certain keyword or syntax to change a destination to be referred to by the code having the keyword or syntax to the gate component.

The processing system according to the present invention enables the user and the system to be reliably protected from a program prepared by a malicious developer.

DESCRIPTION OF THE DRAWING

FIG. 2 shows an exemplary program transmitted from a developer.

FIG. 3 shows an exemplary program that has been processed by a rewriting module.

DETAILED DESCRIPTION OF EMBODIMENTS

The following describes, with reference to the accompanying drawings, a processing system according to an embodiment of the present invention.

The processing system according to the present invention provides a user, via a website, with content in which information acquired from an external server is combined with a program developed by a program developer. Examples include, but are not limited to, providing a user, through a website, with gaming content prepared by combining map information acquired from an external server with a gaming program developed by a program developer. Although the following describes the processing system according to the present invention using a game as an example, the processing system according to the present invention is not limited thereto.

Figure 1:
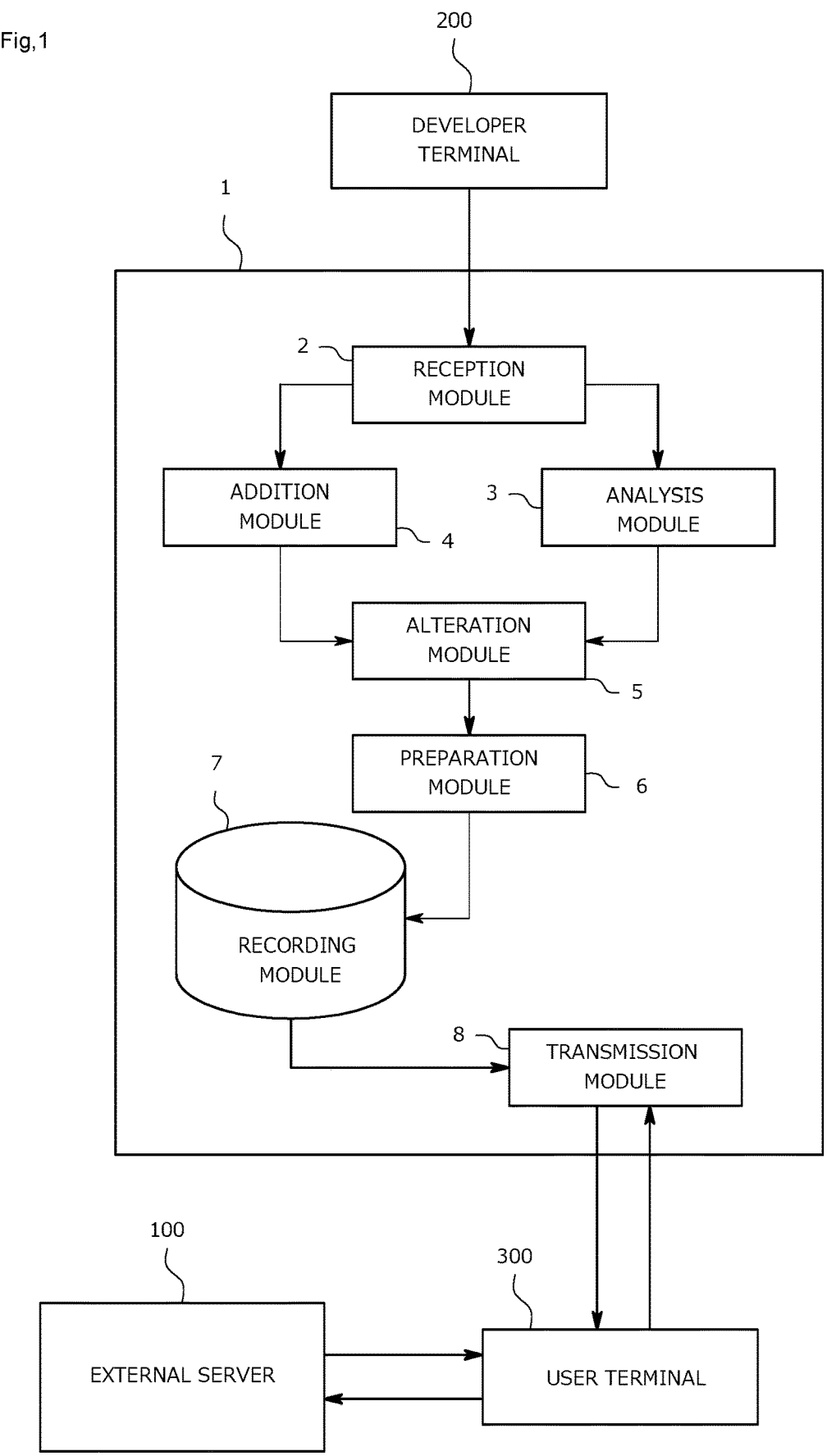
FIG. 1 shows a block diagram of a processing system according to a first embodiment.

This processing system 1 according to the present invention is connected with, as illustrated in FIG. 1, an external server 100, a developer terminal 200 of the program developer, and a user terminal 300 of a user, over a wired or wireless network. The network is connected with the Internet via, for example, a proxy server not illustrated.

The external server 100 transmits information requested from the user terminal 300. Although the present embodiment includes only one external server 100, a plurality of external servers 100 may be provided, in which case the user terminal 300 may request each of the external servers 100 for information.

The developer terminal 200 is, for example, a smartphone, a tablet terminal, or a PC that includes a CPU, a memory, a communication port, and a network interface not illustrated. The developer terminal 200 prepares a program using a source code, such as JavaScript (registered trademark) and TypeScript.

The user terminal 300 is, for example, a smartphone, a tablet terminal, or a PC that includes a CPU, a memory, a communication port, and a network interface not illustrated. With the user terminal 300, the Application Programming Interface (API) is disclosed. The API is a protocol for calling, for example, a program function previously input in the user terminal and data managed by the user terminal. Thus, the program developer uses the API to develop a program to be executed on the user terminal 300. It is noted that the present embodiment assumes that the program code is described using JavaScript (registered trademark).

The following details a configuration of the processing system 1 in the first embodiment.

The processing system 1 is a server including a CPU, a memory, an A/D converter, a communication port, and a network interface. The processing system 1 performs functions as a reception module 2, an analysis module 3, an addition module 4, an alteration module 5, a preparation module 6, a recording module 7, and a transmission module 8 illustrated in FIG. 1 using a certain program installed in the memory.

The reception module 2 receives a program transmitted from the developer terminal 200 and transmits the program to the analysis module 3, the alteration module 5, and an addition module 4. The program has been developed using the API. Examples of the program include, but are not limited to, a treasure hunting game program in which treasure appears when a certain condition is satisfied and an escape game program in which a user is urged to solve puzzles to escape. The treasure hunting game and the escape game constitute an element of gaming content.

The analysis module 3 analyzes the program transmitted from the reception module 2 and detects a portion in which a certain keyword or syntax that performs a process capable of attacking the user or the system is described.

For the sake of explanation, FIG. 2 illustrates an exemplary code description for a case in which, in the program transmitted from the reception module 2, an HTTP request requesting a process to communicate with an external website is described using a window object. In the communication process with the external website, the website as the communication destination, if it is a phishing website, for example, can cause harm to the user. For the sake of explanation, the present embodiment assumes that all of the following codes are contained in a single program.

The window object is described using an open function: window.open("http://maliciousaaaasite.com/","welcome to maliciousaaaa site");

The window object is described as a different variable:

```
var w = window;
w.open("http://maliciousaaaasite.com/","welcome to maliciousaaaa site");
```

The open function is treated as a character string:

```
var o = "open";
window[o]("http://maliciousaaaasite.com/","welcome to maliciousaaaa site");
```

The window object is referred to by "this" without using the word "window": this.open("http://maliciousaaaasite.com/", "welcome to maliciousaaaa site");
The window object is represented using a global variable as the open function: open("http://maliciousaaaasite.com/", "welcome to maliciousaaaa site");
The above examples are combined with each other:

```
    var w = window;
    var o = "open";
    var url = "http://maliciousaaaasite.com/";
    var msg = "welcome to maliciousaaaa site";
    w[o](url,msg);
```

The following describes a case in which, in the program transmitted from the reception module 2, an HTTP request requesting a process to communicate with an external website is described using a DOM object.

An example of the above case is a code description including a DOM into which a script tag is injected using an inner HTML:

```
var dom = window.document.createElement ("div");
dom.innerHTML =
'<script>open(http:// maliciousaaaasite.com/)</script>';
```

In addition to the above-described examples, still another example is possible, in which the description includes a dummy code, for example.

The analysis module 3 identifies a certain keyword or syntax from among the codes described in various ways as exemplified in the above examples and transmits data indicating the analysis to the alteration module 5. In the above examples, the analysis module 3 identifies the keyword of "window" or the syntax including a function indicating a window object (for example, the open function) and transmits the data indicating the analysis to the alteration module 5.

The addition module 4 adds to the program received by the reception module 2 a gate component that restricts a process of attacking the user or the system. In the present embodiment, as illustrated in FIG. 3, programs P2 and P3 that serve as the gate components are added to the program received by the reception module 2.

Examples of the processes restricted by the gate component include, but are not limited to, a process of communicating with the external server 100 or a website, a process of reading a file, a loop process, a log-out or log-in automatic operation process, a process to link to another website without involving a confirmation screen, a cookie reading process, a process to upload or download an execution file, processes that considerably restrict browser processes and that are executed consecutively, a plug-in calling process, and a process defining long data or performing long calculations.

The following details, out of the above-described processes, the process of communicating with the external server 100 or a website, the process of reading a file, and the loop process more specifically. The process of communicating with the external server 100 or a website is interrupted, if the URL of the destination to be accessed falls within a domain of which security has not previously been confirmed. The process of reading a file is interrupted, if the file to be referred has previously been inhibited (for example, a file containing customer information and personal information). The loop process is interrupted, if a loop count described in the code exceeds a previously established upper limit.

The alteration module 5, having received the analysis from the analysis module 3, alters the code having the keyword or syntax that performs, for example, the process of reading a file, the process of communicating with the external server 100 or a website, and the loop process and adds a code to change the destination to be referred to by the code having the keyword or syntax to a gate component.

More specifically, when the HTTP request requesting a process of communicating with an external website is described using a window object in the program transmitted from the reception module 2, the alteration module 5 changes the window portion to fakeWindow as illustrated in FIG. 3. The "fakeWindow" indicates a gate component.

For a portion representing a window object without using the keyword "window", a keyword of "fakewindow" is added, so that the alteration is precisely made such that the destination to be referred to by the code is a gate component.

The alteration module 5, by performing the foregoing steps, prepares a program P1 in which the destination to be referred to by the code having the keyword or syntax is changed to a gate component.

The preparation module 6 acquires the program P1, the program P2, and the program P3 prepared through the addition module 4 and the alteration module 5 and prepares an initial program that represents a previously prepared regular program in which a program X composed of the program P1, the program P2, and the program P3 is embedded. Functioning in the user terminal 300, the initial program requests acquisition of information that the external server 100 has, and issues a command to prepare new content. It is noted that, in the present embodiment, only the program P1 prepared through the alteration module 5 is incorporated when the initial program is to be prepared. A plurality of programs altered by the alteration module 5 may nonetheless be incorporated.

The recording module 7 records the initial program. It is noted that the recording module 7 may record the initial program by linking, during recording, with the initial program information on, for example, time at which the reception module 2 received the program and on a name of the program.

The transmission module 8 receives a request for the initial program from the user terminal 300, extracts the initial program from the recording module 7, and transmits the initial program to the user terminal 300.

The user terminal 300 executes the initial program transmitted from the transmission module 8 and requests the external server 100 for information. The external server 100 transmits the information to the user terminal 300. The user terminal 300 combines the information with the program X or the regular program to create new content. The new content relates to what is called a real game, for example, in which map information is acquired from the external server 100 and treasure is disposed at a certain point on the map; various types of traps linked with position information are set along a path from a current position of the user to the point; and the user actually moves to the point to solve the trap, thereby getting the treasure.

With the processing system in the above-described first embodiment, the destinations to be referred to by the code containing processes that can cause harm to the user are equally changed to the gate component. Thus, when the program is executed, all processes to be executed by the code having a specific keyword or syntax are subjected to the gate component. The gate component restricts performance of previously established processes that cause harm to the user during the execution of the program. Thus, even when the code performing the processes that cause harm to the user is disguised, the destination to be referred to by the disguised code is changed to the gate component. When the program is executed, therefore, the gate component restricts performance of the processes that cause harm to the user. Thus, regardless of whether the code is disguised, any attack from the program developer can be reliably prevented.

Specifically, when a malicious developer includes in the program a process of communicating with a web browser that leads to a phishing website or an unauthorized website, the process can be interrupted in the gate component and the user can thereby be protected. Consider a situation in which the malicious developer performs a process to read a file that contains personal information in order to acquire personal information stored in the user terminal. The file that contains the personal information may be defined in advance as being inhibited from reading. If the file to be referred to for the performance of the process falls within a read-inhibited file category, the process is interrupted to prevent the personal information from being acquired, so that the user is protected. In addition, if the malicious developer includes in the program a loop process for imposing load on the user terminal, the loop process is interrupted when the number of loops of the loop process exceeds a previously established number, so that the load on the user terminal can be reduced.

Figure 4:
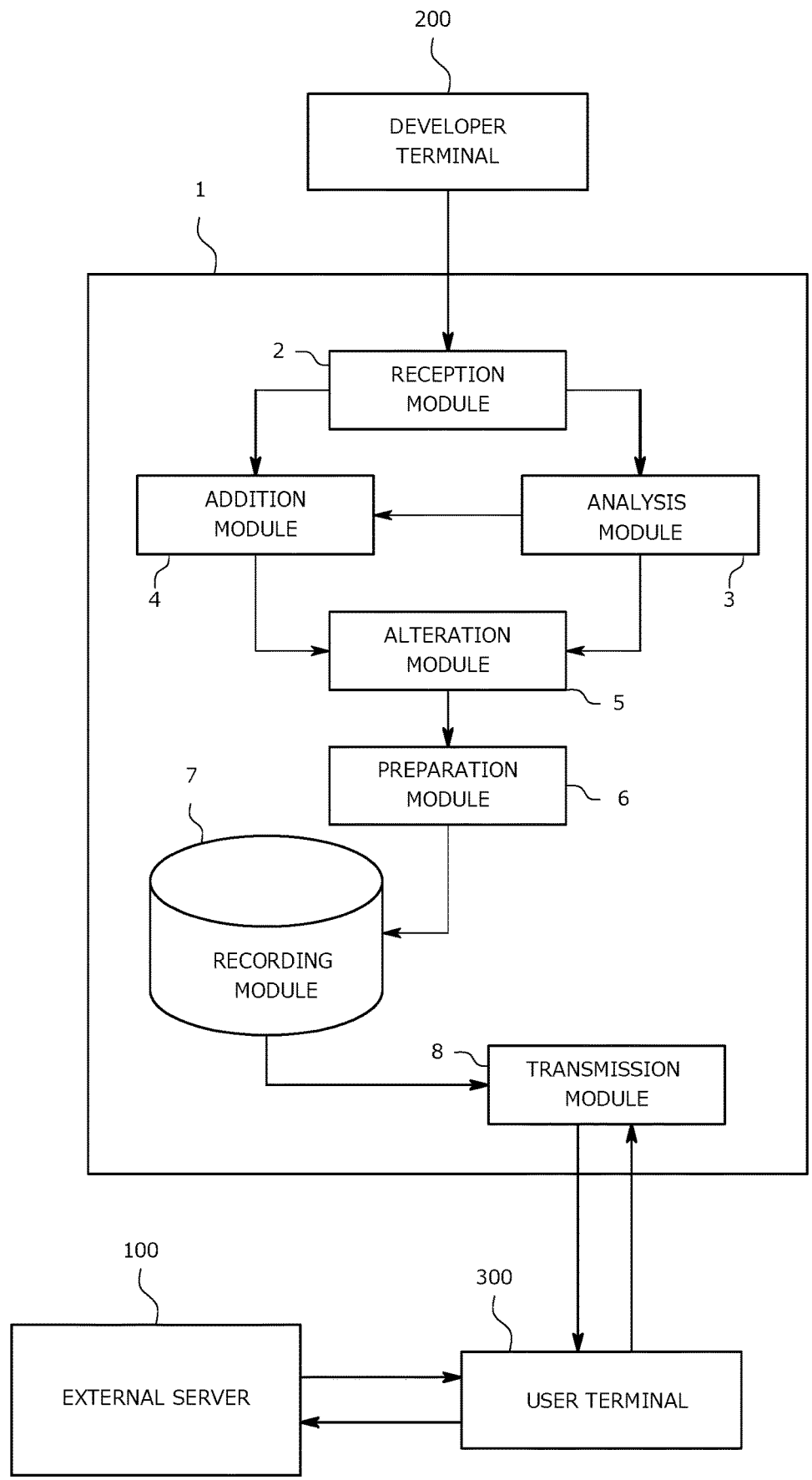
FIG. 4 shows a block diagram of a processing system according to a modification of the first embodiment.

As a modification of the first embodiment, the addition module 4 may acquire the analysis data prepared by the analysis module 3 as illustrated in FIG. 4, to prepare a gate component that corresponds to the process included in the analysis data. Such a configuration allows the gate component to be customized so as to suit the program, so that the process can be optimized for reduced processing time.

Additionally, the first embodiment is configured such that the destination to be referred to by the code having the keyword or syntax is changed to the gate component in the alteration module after processing is performed by the addition module that adds the gate component. Another possible configuration is such that the gate component may be added by the addition module after processing is performed by the alteration module. Still another possible configuration is such that the gate component may be added by the preparation module.

The following describes a processing system according to a second embodiment of the present invention.

The processing system in the second embodiment differs from the processing system in the first embodiment in that the program is executed on the processing system side. Like or corresponding elements are identified by the same reference numerals as those used in the first embodiment and descriptions for those elements will be omitted.

Figure 5:
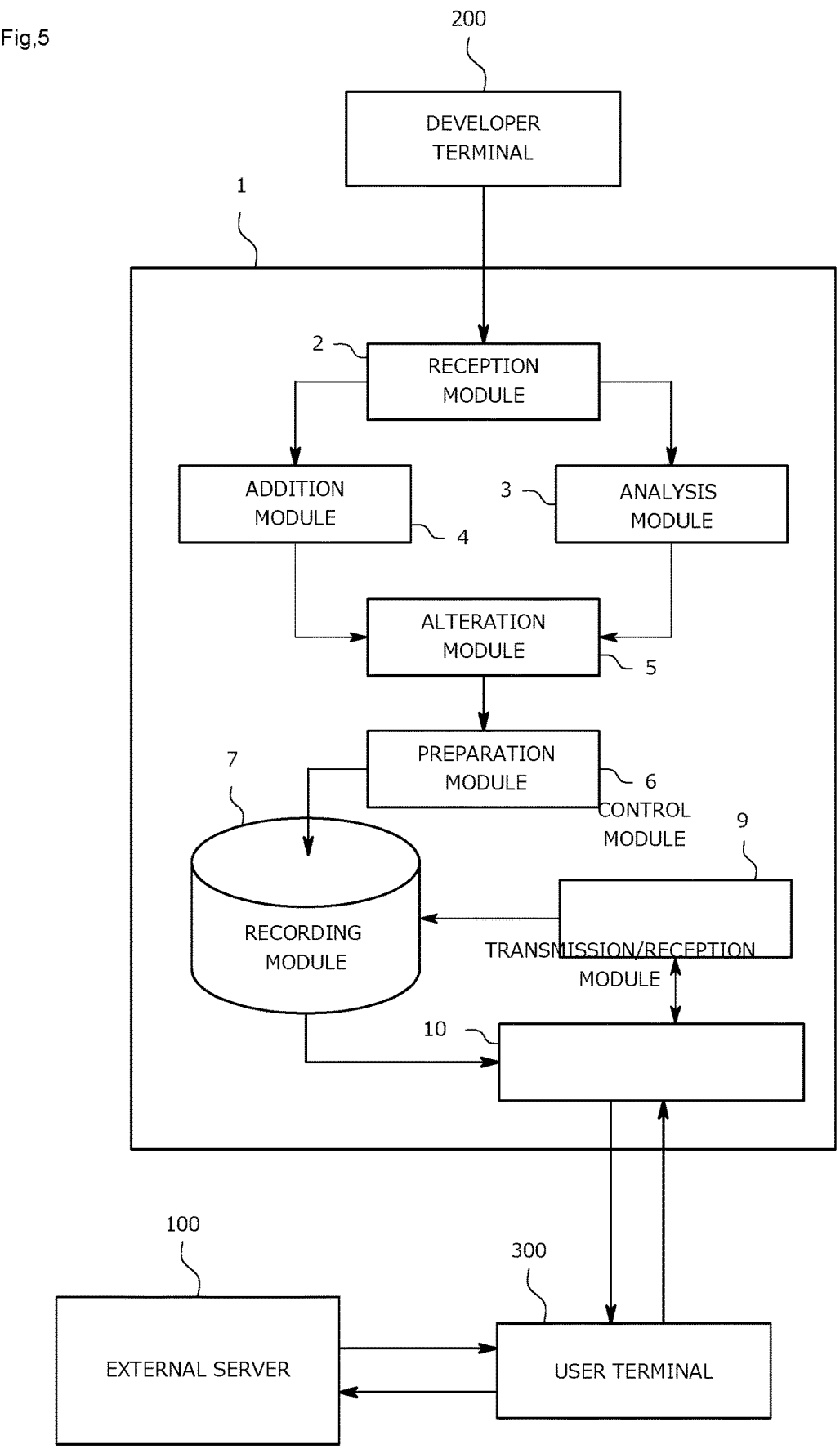
FIG. 5 shows a block diagram of a processing system according to a second embodiment.

The processing system in the second embodiment includes, in addition to the reception module 2, the analysis module 3, the addition module 4, the alteration module 5, the preparation module 6, and the recording module 7, a control module 9 that executes a program and a transmission/reception module 10 that performs communication with the user terminal 300, as illustrated in FIG. 5.

The processing system in the second embodiment will be described using as an example a travel booking website.

A travel booking website typically includes a search screen, a selection screen, and a booking screen. The search screen allows the user to enter a date and time, a target site, expenses, and other conditions required by the user and to perform a search operation. The selection screen displays search results from which a desired plan is to be selected. The booking screen allows the user to enter, for example, the number of persons and a room type in the desired plan to complete the booking.

To customize the screens in the booking website so as to make them user-friendlier, the program developer prepares a plurality of programs to correspond to the screens.

The reception module 2 acquires these programs and transmits the programs to the analysis module 3 and the addition module 4. The alteration module 5 alters the programs to which the gate component has been added by the addition module 4 on the basis of analysis data obtained from the analysis module 3.

Assume that the program developed by the developer includes the following code that performs a process to read a file:

```
function showFile (err, txt) {
console.log ("err:" + err);
console.log ("txt:" + txt);
}
var fs = require ("fs");
fs.readFile ("test.txt", "utf-8", showFile);
```

In this case, the alteration module 5 alters the code as follows:

```
function showFile (err, txt) {
console.log ("err:" + err);
console.log ("txt:" + txt);
}
var fs = fakeRequire ("fs");
fs.readFile ("test.txt", "utf-8", showFile);
```

In the above-described code, fakeRequire indicates a gate component and the destination referred to by this code is changed to a gate component.

Assume that the code that performs a process to read a file is described as follows:

```
function showFile (err, txt) {
var a = require ("fs");
var b = "readFile";
var c = "test.txt";
var d = "utf-8";
var e = showFile;
a [b] (c, d, e);
}
```

In this case, the code is altered as follows and the destination referred to by this code is changed to a gate component.

```
var a = fakeRequire ("fs");
var b = "readFile";
var c = "test.txt";
var d = "utf-8";
var e = showFile;
a [b] (c, d, e);
``` where fakeRequire indicates a gate component and the destination referred to by this code is changed to a gate component.

The preparation module 6 incorporates the program that has been through the alteration module 5 in the regular program. The present embodiment has a plurality of regular programs input in advance. The program that has been through the alteration module 5 is incorporated in any of the regular programs. Still, a plurality of programs that have been through the alteration module 5 may be incorporated in the regular programs.

For the sake of explanation, the present embodiment assumes that the program that has been through the alteration module 5 is incorporated in each of a first regular program that constitutes the search screen, a second regular program that constitutes the selection screen, and a third regular program that constitutes the booking screen. A first program, a second program, and a third program are thereby prepared.

The first program, the second program, and the third program are each recorded in the recording module 7.

The control module 9, having received a request from the user terminal 300, extracts to execute one of the first program, the second program, and the third program recorded in the recording module 7. The control module 9 then displays data indicating results of execution of the program on the user terminal 300 via the transmission/reception module 10.

Specifically, the control module 9 receives via the transmission/reception module 10 an access request from the user terminal 300 that has accessed a travel website. The control module 9 next selects to execute the first program out of the programs recorded in the recording module 7. The control module 9 then displays the data (search screen) indicating the results of execution of the program on, for example, a display of the user terminal 300 via the transmission/reception module 10.

Next, the user inputs, for example, a desired date and time, and site and touches a search button on the search screen. The control module 9 receives this request via the transmission/reception module 10 and extracts to execute the second program as selected from the recording module 7. The control module 9 then displays data (selection screen) indicating the results of execution of the program on, for example, the display of the user terminal 300 via the transmission/reception module 10.

Finally, when the user selects a desired plan from the selection screen, the control module 9 receives this request via the transmission/reception module 10. The control module 9 extracts to execute the third program as selected from the recording module 7 and displays data (booking screen) indicating the results of execution of the program on, for example, the display of the user terminal 300 via the transmission/reception module 10. The user inputs required information on the booking screen to complete the booking of the travel.

In the processing system in the second embodiment, a plurality of programs are executed on the system side upon request from the user terminal 300. Even when the programs contain a malicious code developed by the developer, the alteration module 5 equally changes the destination to be referred to by the code to a gate component. When the programs are executed, therefore, the gate component restricts performance of a process that causes harm to the system, so that the system can be reliably protected.

The processes restricted by the gate component are similar to those in the first embodiment and descriptions therefor will here be omitted. Specifically, when a malicious developer performs a process to read a file that contains customer information in order to acquire, for example, customer information stored in the system, the file that contains the customer information may be defined in advance as a read-inhibited file and, if the file to be referred for the performance of the process is a read-inhibited file, the process is interrupted and the system is properly protected. When the malicious developer includes a loop process in order to impose load on the system, the loop process is interrupted if the number of loops of the loop process exceeds a predetermined number that may be established in advance, so that the load on the system can be reduced.

The processing systems in the above-described embodiments of the present invention are illustrative only and not limiting.

For example, the programs in the above-described embodiments, although being prepared using JavaScript (registered trademark), may be prepared using another programming language, such as Ruby and PHP.

Additionally, while the program developed by the developer is incorporated in all programs in the second embodiment, there may be a regular program that contains no such program developed by the developer.

Various modifications of the present invention may be made without departing from the scope and spirit of this invention.

What is claimed is:

1. A processing system configured to process a program transmitted from outside through a wired or wireless network, the processing system comprising a processor circuit configured to:
   receive the program;
   analyze a code having a certain keyword or syntax included in the program;
   perform a specific process input in advance in response to the analysis result;
   create a gate component that restricts a process of attacking a user or the system by combining codes corresponding to the processing included in the analysis result and the code to perform specific processes that have been input in advance;
   add to the program the gate component that restricts a process of attacking a user or the system; and
   alter, in the program, the code having the keyword or syntax to change a destination to be referred to by the code having the keyword or syntax to the gate component.

2. A processing method performed by a processor circuit for processing a program transmitted from outside through a wired or wireless network, the processing method comprising:
   a first step of:
      receiving, by the processor circuit, the program;
      analyzing, by the processor circuit, a code having a certain keyword or syntax included in the program;
      performing, by the processor circuit, a specific process input in advance in response to the analysis result; and
      creating, by the processor circuit, a gate component that restricts a process of attacking a user or the system by combining codes corresponding to the processing included in the analysis result and the code to perform specific processes that have been input in advance;
   a second step of adding to the program, by the processor circuit, the gate component that restricts a process of attacking a user or a system; and
   altering in the program, by the processor circuit, the code having the keyword or syntax to change a destination to be referred to by the code having the keyword or syntax to the gate component.

3. A non-transitory computer readable storage medium storing therein a computer program for processing a program transmitted from outside through a wired or wireless network, the computer program causing a processor circuit of a computer to execute:
   a first step of:
      receiving, by the processor circuit, a program transmitted from outside through a wired or wireless network,
      analyzing, by the processor circuit, the program and detecting a code having a certain keyword or syntax included in the program,
      performing, by the processor circuit, a specific process input in advance in response to the analysis result, and
      creating, by the processor circuit, a gate component that restricts a process of attacking a user or the system by combining codes corresponding to the processing included in the analysis result and the code to perform specific processes that have been input in advance; and a second step of adding to the program, by the processor circuit, the gate component that restricts a process of attacking a user or a system; and altering in the program, by the processor circuit, the code having the keyword or syntax to change a destination to be referred to by the code having the keyword or syntax to the gate component.

* * * * *